(12) United States Patent
Gupte

(10) Patent No.: US 11,121,970 B2
(45) Date of Patent: *Sep. 14, 2021

(54) CREATING ENDPOINTS

(71) Applicant: Capital One Services, LLC, McLean, VA (US)

(72) Inventor: Saurabh Gupte, San Mateo, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,704

(22) Filed: May 18, 2020

(65) Prior Publication Data

US 2020/0280515 A1    Sep. 3, 2020

Related U.S. Application Data

(63) Continuation of application No. 16/246,630, filed on Jan. 14, 2019, now Pat. No. 10,693,780, which is a continuation of application No. 16/043,811, filed on Jul. 24, 2018, now Pat. No. 10,182,009.

(51) Int. Cl.

| | |
|---|---|
| *H04L 12/721* | (2013.01) |
| *H04L 29/08* | (2006.01) |
| *G06F 9/445* | (2018.01) |
| *H04W 4/70* | (2018.01) |

(52) U.S. Cl.
CPC .......... *H04L 45/72* (2013.01); *G06F 9/44505* (2013.01); *H04L 67/02* (2013.01); *H04L 67/10* (2013.01); *H04L 67/34* (2013.01); *H04W 4/70* (2018.02)

(58) Field of Classification Search
CPC ......... H04L 45/72; H04L 67/34; H04L 67/10; H04L 67/02; G06F 9/44505; H04W 4/70
See application file for complete search history.

(56) References Cited

U.S. PATENT DOCUMENTS

| | | | |
|---|---|---|---|
| 10,043,012 B2 * | 8/2018 | Cornell | G06F 21/577 |
| 10,182,009 B1 | 1/2019 | Gupte et al. | |
| 10,810,110 B1 * | 10/2020 | Thomas | G06F 11/3688 |

(Continued)

OTHER PUBLICATIONS

Amazon Web Services Inc., "Build an API with HTTP Custom Integration," https://docs.aws.amazon.com/apigateway/latest/developerguide/api-gateway-create-api-step-by-step.html, Apr. 16, 2018, 40 pages.

(Continued)

*Primary Examiner* — Will W Lin
(74) *Attorney, Agent, or Firm* — Harrity & Harrity, LLP

(57) ABSTRACT

A device receives a configuration file that includes an object concerning a Hypertext Transfer Protocol (HTTP) route. The object includes a parameter, related to the HTTP route, that includes one or more elements related to the HTTP route, and includes an attribute related to an HTTP action. The device parses the configuration file to recognize the object, and parses the object to recognize the parameter. The device creates the HTTP route based on the parameter. The HTTP route includes information concerning the one or more elements related to the HTTP route and the attribute related to the HTTP action, and sends the HTTP route to a server, causing the server to perform an operation based on the HTTP route.

20 Claims, 11 Drawing Sheets

(56) References Cited

U.S. PATENT DOCUMENTS

| | | |
|---|---|---|
| 2014/0280515 A1 | 9/2014 | Wei et al. |
| 2014/0371894 A1* | 12/2014 | Shan ................. G06F 3/165 |
| | | 700/94 |
| 2015/0088968 A1 | 3/2015 | Wei et al. |
| 2016/0065499 A1 | 3/2016 | Holmes et al. |
| 2016/0366248 A1 | 12/2016 | Zhong |
| 2017/0257419 A1* | 9/2017 | Lee ................. H04L 67/1097 |
| 2018/0025154 A1* | 1/2018 | Cornell ............. H04L 63/1425 |
| | | 726/25 |
| 2018/0121320 A1* | 5/2018 | Dolby ................ G06F 11/3608 |
| 2018/0196899 A1* | 7/2018 | Crabtree .............. G06N 7/005 |
| 2019/0075168 A1* | 3/2019 | Goldfarb ............ H04L 63/0272 |
| 2019/0334873 A1* | 10/2019 | Kulkarni ............. H04L 63/04 |
| 2020/0036631 A1 | 1/2020 | Gupte |

OTHER PUBLICATIONS

Log Kit, "HTTP JSON Endpoint," http://www.logkit.info/docs/2.1/endpoints/http-json/, Oct. 6, 2015, 3 pages.

Parlette C., "JSON over HTTP-Data Collection Made Simple," https://www.circonus.com/2014/03/json-over-http/, Mar. 10, 2014, 5 pages.

Xmatters Inc., "HTTP Endpoints," https://help.xmatters.com/ondemand/xmodwelcome/integration builder/configure-endpoints.htm, Feb. 26, 2016, 10 pages.

* cited by examiner

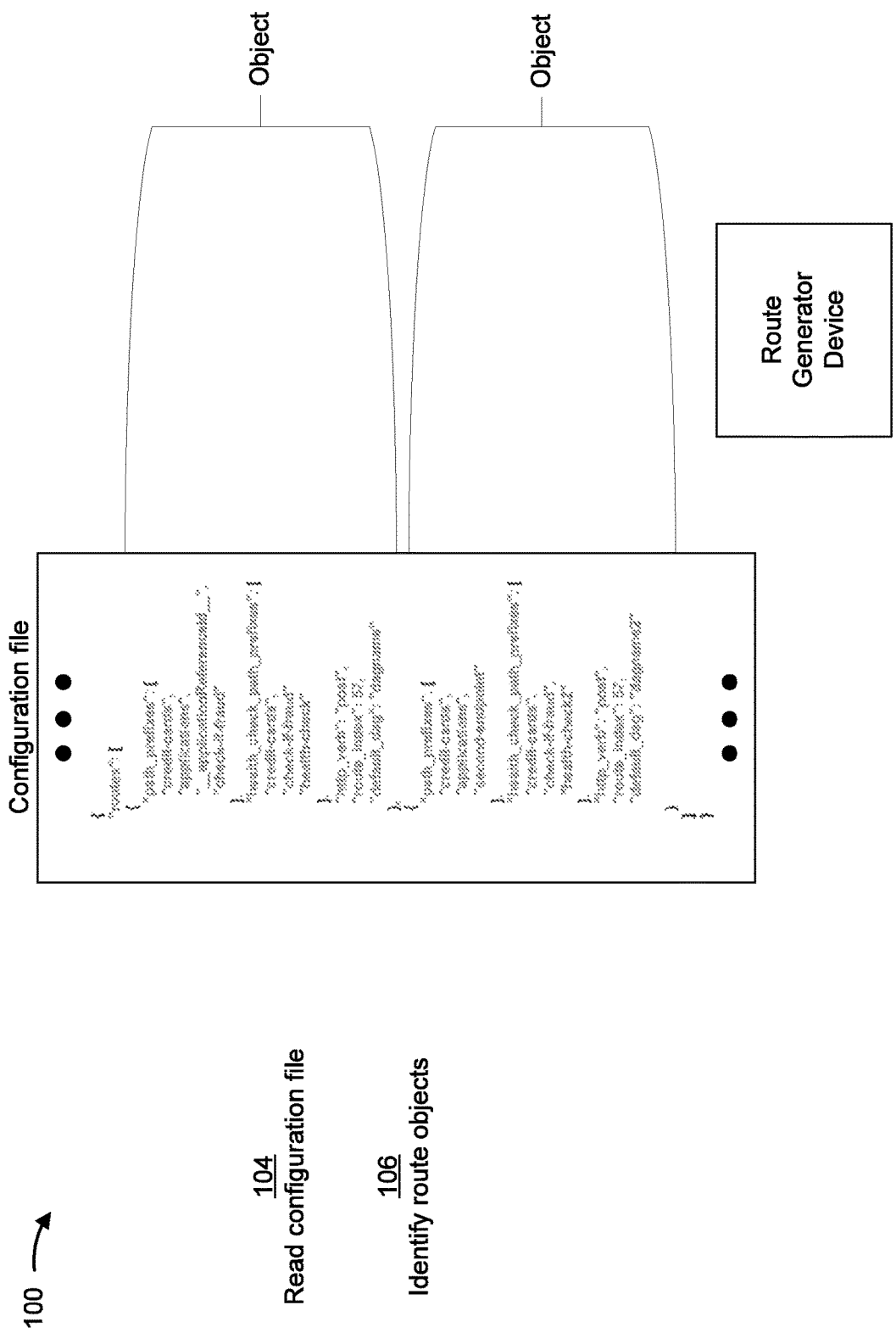

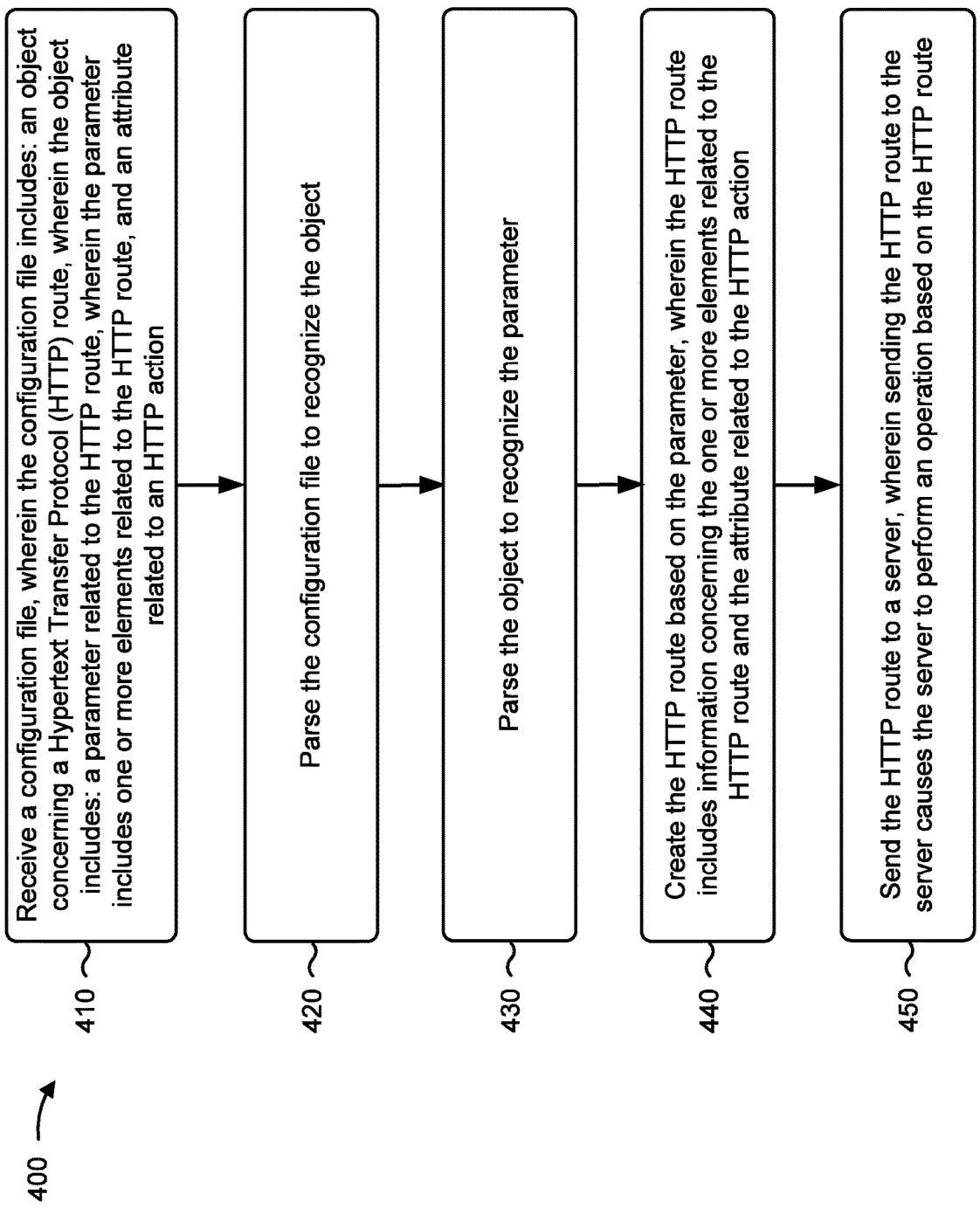

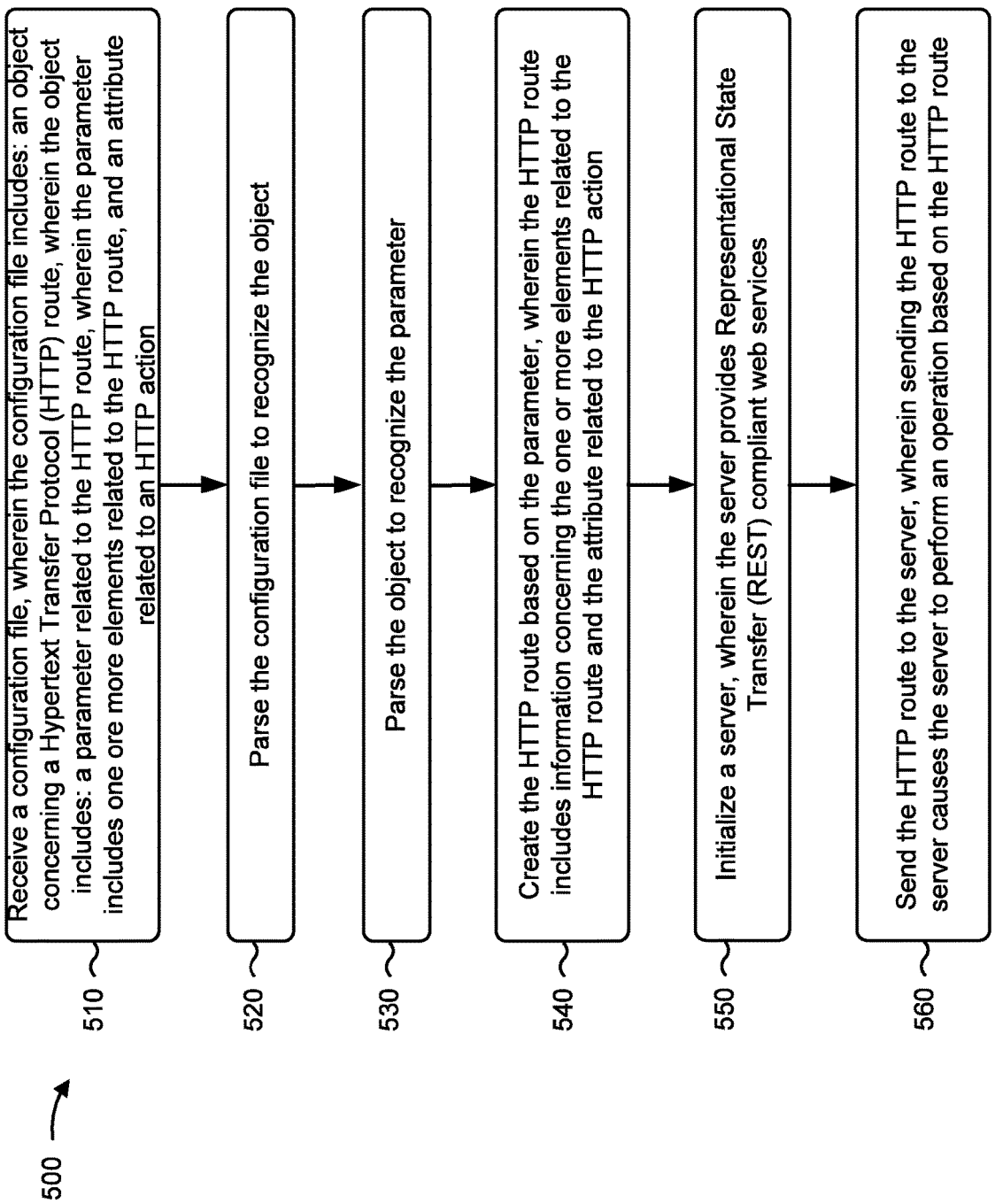

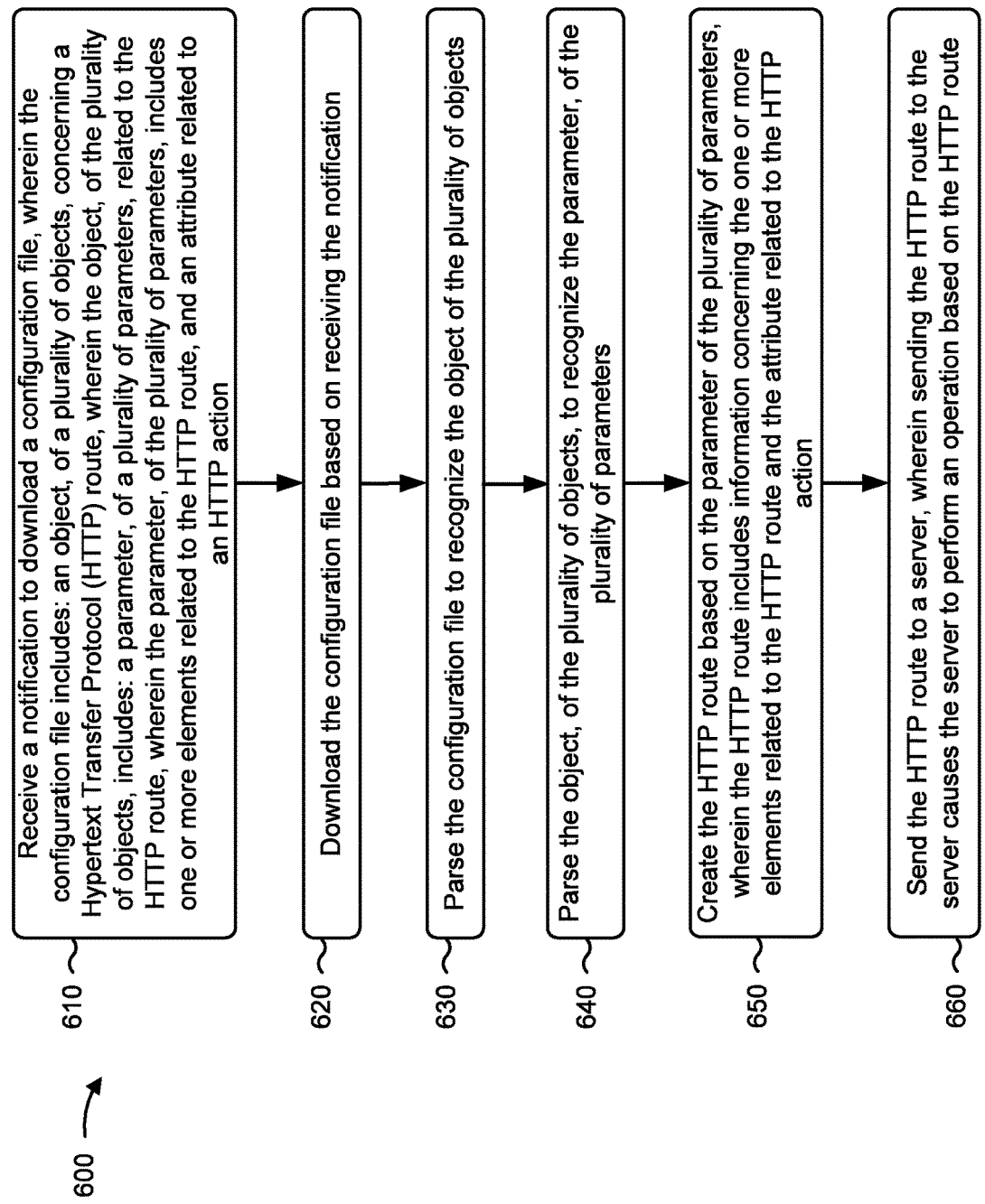

CREATING ENDPOINTS

RELATED APPLICATIONS

This application is a continuation of U.S. patent application Ser. No. 16/246,630, filed Jan. 14, 2019, which is a continuation of U.S. patent application Ser. No. 16/043,811, filed Jul. 24, 2018 (now U.S. Pat. No. 10,182,009), which are incorporated herein by reference.

BACKGROUND

An application programming interface (API) is a tool that provides machine-to-machine communication. Endpoints can specify the location and/or provide access to API resources.

SUMMARY

According to some implementations, a method may include receiving, by a processor, a configuration file, wherein the configuration file includes an object concerning a Hypertext Transfer Protocol (HTTP) route, wherein the object includes a parameter related to the HTTP route, and wherein the parameter includes one or more elements related to the HTTP route, and an attribute related to an HTTP action. The method may include parsing, by the processor, the configuration file to recognize the object, and parsing, by the processor, the object to recognize the parameter. The method may include creating, by the processor, the HTTP route based on the parameter, wherein the HTTP route includes information concerning the one or more elements related to the HTTP route and the attribute related to the HTTP action. The method may include sending, by the processor, the HTTP route to a server, wherein sending the HTTP route to the server causes the server to perform an operation based on the HTTP route.

According to some implementations, a device may include one or more memories, and one or more processors, operatively coupled to the one or more memories, to receive a configuration file, wherein the configuration file includes an object concerning a Hypertext Transfer Protocol (HTTP) route, wherein the object includes a parameter related to the HTTP route, and wherein the parameter includes one or more elements related to the HTTP route, and an attribute related to an HTTP action. The one or more processors may parse the configuration file to recognize the object, and parse the object to recognize the parameter. The one or more processors may create the HTTP route based on the parameter, wherein the HTTP route includes information concerning the one or more elements related to the HTTP route and the attribute related to the HTTP action. The one or more processors may initialize a server, wherein the server provides Representational State Transfer (REST) compliant web services, and send the HTTP route to the server, wherein sending the HTTP route to the server causes the server to perform an operation based on the HTTP route.

According to some implementations, a non-transitory computer-readable medium may store instructions that include one or more instructions that, when executed by one or more processors of a device, cause the one or more processors to receive a notification to download a configuration file, wherein the configuration file includes an object, of a plurality of objects, concerning a Hypertext Transfer Protocol (HTTP) route, wherein the object, of the plurality of objects, includes a parameter, of a plurality of parameters, related to the HTTP route, and wherein the parameter, of the plurality of parameters, includes one or more elements related to the HTTP route, and an attribute related to an HTTP action. The one or more instructions may cause the one or more processors to download the configuration file based on receiving the notification, to parse the configuration file to recognize the object of the plurality of objects, and to parse the object, of the plurality of objects, to recognize the parameter, of the plurality of parameters. The one or more instructions may cause the one or more processors to create the HTTP route based on the parameter of the plurality of parameters, wherein the HTTP route includes information concerning the one or more elements related to the HTTP route and the attribute related to the HTTP action. The one or more instructions may cause the one or more processors to send the HTTP route to a server, wherein sending the HTTP route to the server causes the server to perform an operation based on the HTTP route.

BRIEF DESCRIPTION OF THE DRAWINGS

FIGS. 1A-1F are diagrams of example implementations described herein.

FIG. 4 is a flow chart of an example process for creating endpoints.

FIG. 5 is a flow chart of an example process for creating endpoints.

FIG. 6 is a flow chart of an example process for creating endpoints.

DETAILED DESCRIPTION

The following detailed description of example implementations refers to the accompanying drawings. The same reference numbers in different drawings may identify the same or similar elements.

A user may create an endpoint to specify a location and/or provide access to resources related to an application programming interface (API). However, APIs were designed to facilitate machine-to-machine communication, thus creating endpoints by hand can be a tedious task for the user. Moreover, software tools and frameworks that allow the user to write computer code to create endpoints can be confusing and overcomplicated, especially when the user needs to create only a few endpoints. Even where the user is proficient at writing computer code, the user may need to write an extensive amount of code to generate just one endpoint.

Some implementations described herein provide a route generator device that is capable of creating a hypertext transfer protocol (HTTP) route (e.g., executable computer code) based on a configuration file, such that executing the HTTP route at a server device creates an endpoint. In some implementations, the user may describe the endpoint in the configuration file in a human-readable format and send the configuration file to the route generator device. In some implementations, the configuration file can include information (e.g., objects, parameters, elements, attributes, identification information, and/or the like) that can be parsed and processed by the route generator device to create the HTTP route. In some implementations, the configuration file can include information that can be parsed and processed by the route generator device to create multiple HTTP routes.

In this way, implementations described herein enable a user to easily create endpoints. This reduces the amount of technical training or API-specific knowledge that the user needs to create the endpoint. This also reduces the amount of time a user has to spend on creating the endpoints, which reduces costs and conserves computing resources that the user would otherwise use to create the endpoints. Moreover, implementations described herein enforce uniformity and consistency in computer code deployments for creating endpoints, which reduces the possibilities of computer code defects and the need for testing and debugging of computer code. This can conserve processor and/or memory resources of the client device, route generator device, and/or the server device that would otherwise be wasted testing and debugging computer code.

Figure 1A:
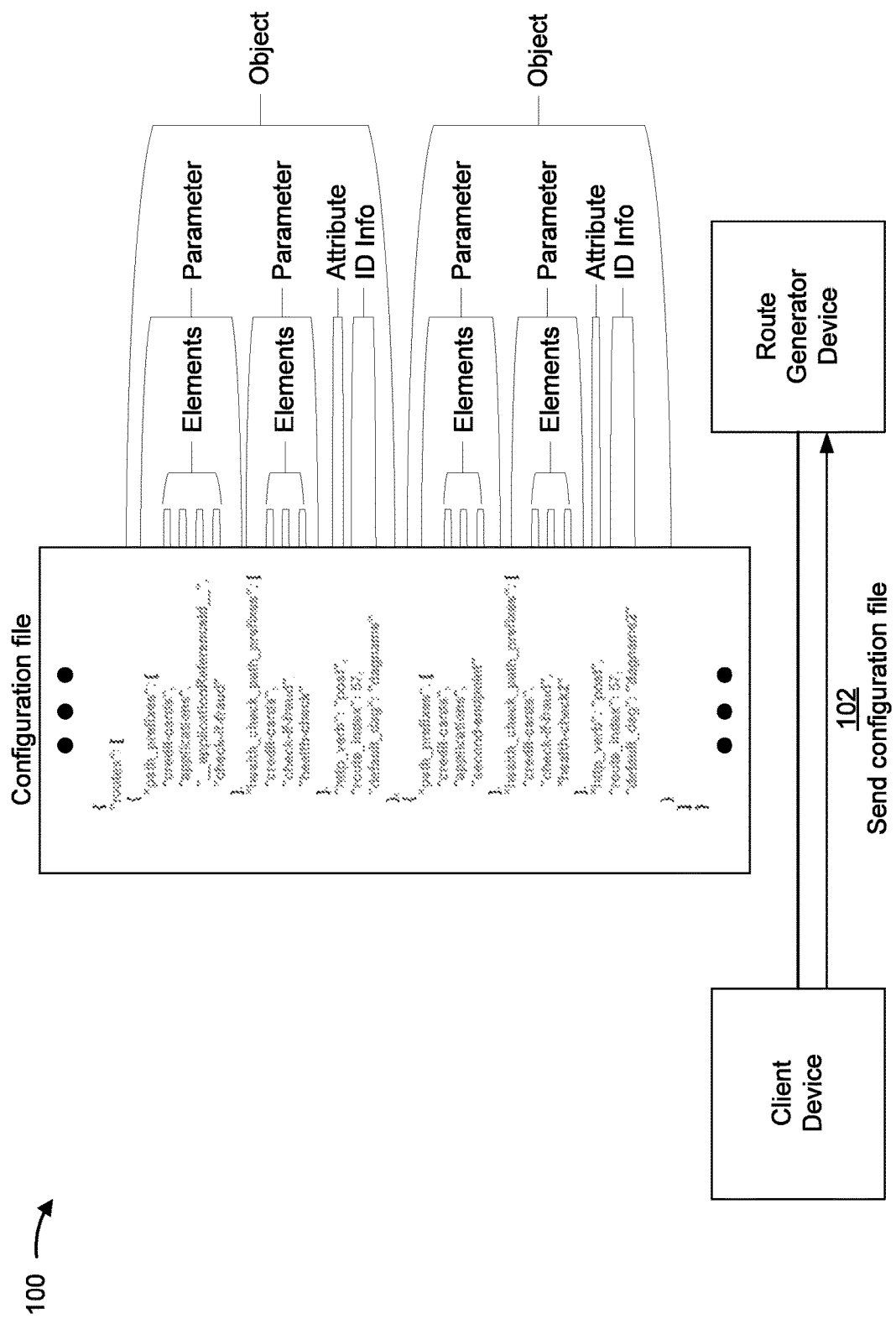

FIGS. 1A-1F are diagrams of example implementations 100 described herein. As shown in FIG. 1A, implementation 100 may include a client device, a route generator device, and a configuration file. In some implementations, implementation 100 may include the client device, the route generator device, the configuration file, and a server device. In some implementations, the client device may be a communication and/or computing device, such as a mobile phone, a smartphone, a laptop computer, a tablet computer, and/or the like. In some implementations, the route generator device may be a communication and/or computing device, such as a server, and/or the like. In some implementations, the server device may be a communication and/or computing device, such as a server, and/or the like. In some implementations, the client device, the route generator device, and the server device may be connected to a network and may communicate to each other via the network.

In some implementations, an endpoint (e.g., a hypertext transfer protocol (HTTP) endpoint, an application programming interface (API) endpoint, and/or the like) specifies the location of and/or provides access to an API resource. In some implementations, an HTTP route may include computer code that conforms to a domain specific language (DSL), such that an endpoint is created on the server device when the server device executes the HTTP route. For example, the HTTP route may include computer code that conforms to an Akka HTTP DSL, such that an HTTP endpoint is created on the server device when the server device executes the HTTP route.

In some implementations, the configuration file may conform to a human-readable or machine-readable data format. In some implementations, the configuration file may use a JavaScript Object Notation (JSON), Extensible Markup Language (XML), and/or the like file format. In some implementations, the configuration file may include one or more objects, where each of the one or more objects concerns one or more HTTP routes. For example, as shown in FIG. 1A, the configuration file may use a JSON file format and include multiple "routes" objects. In some implementations, the client device sends the configuration file to the route generator device to create the one or more HTTP routes.

In some implementations, of the one or more objects may include one or more parameters. For example, as shown in FIG. 1A, the first "routes" object of the configuration file may include a "path_prefixes" parameter and a "health_check_path_prefixes" parameter. In some implementations, a parameter of the one or more parameters is related to one HTTP route of the one or more HTTP routes. For example, as shown in FIG. 1A, the first "routes" object of the configuration file may include a "path_prefixes" parameter related to a first HTTP route of the one or more HTTP routes and a "health_check_path_prefixes" parameter related to a second HTTP route of the one or more HTTP routes. In some implementations, the object may include an HTTP route action. For example, as shown in FIG. 1A, the first "routes" object of the configuration file may include an "http_verb" attribute. In some implementations, the HTTP route action may specify an action that is included in the one HTTP route that is related to the parameter. For example, as shown in FIG. 1A, the "http_verb" attribute of the first "routes" object indicates that a "post" action may be included with the first HTTP route associated with the "path_prefixes" parameter and the second HTTP route associated with the "health_check_path_prefixes" parameter, respectively.

In some implementations, the object may include object identification information. For example, as shown in FIG. 1A, the first "routes" object of the configuration file may include object identification information that comprises a "route_index" and a "default_dag" (where, e.g., "dag" stands for directed acyclic graph). In some implementations, the object identification information is included in the one HTTP route that is related to the parameter.

In some implementations, an HTTP path represents the address of the location of the API resource associated with the endpoint. In some implementations, the parameter may include one or more path elements related to the HTTP path (e.g., a path element may be the text between slashes (e.g., "/") in a uniform resource locator (URL) address). For example, as shown in FIG. 1A, the "path_prefixes" parameter may include a "credit-cards" path element, an "applications" path element, a "_applicationReferenceID_" path element, and a "check-if-fraud" path element related to an HTTP path (e.g., the URL address for the HTTP path may be "/credit-cards/applications/_applicationReferenceID_/check-if-fraud").

As shown by reference number 102, a user may create and send the configuration file, via the client device, to the route generator device. In some implementations, the user may create and send the configuration file, via the client device, to the route generator device for the route generator device to process the configuration file and create the one or more HTTP routes. In some implementations, the route generator device may receive the configuration file sent by the client device. In some implementations, the client device may send a notification to the route generator device to download the configuration file (e.g., from the client device or from another device). In some implementations, the route generator device may download the configuration file (e.g., from the client device or the other device) based on receiving the notification.

As shown in FIG. 1B and by reference number 104, the route generator device may read the configuration file. In some implementations, the route generator device may determine the file format of the configuration file by reading the configuration file. As shown by reference number 106, the route generator device may recognize and/or identify the one or more objects of the configuration file. In some implementations, the route generator device may parse the configuration file to recognize and/or identify the one or more objects. In some implementations, the route generator device may parse the configuration file based on the file format of the configuration file to recognize and/or identify the one or more objects. For example, as shown in FIG. 1B, the route generator device may read the configuration file, determine that the configuration file uses a JSON file format, parse the configuration file based on the configuration file's JSON file format, and recognize the "routes" objects of the configuration file.

Figure 1C:
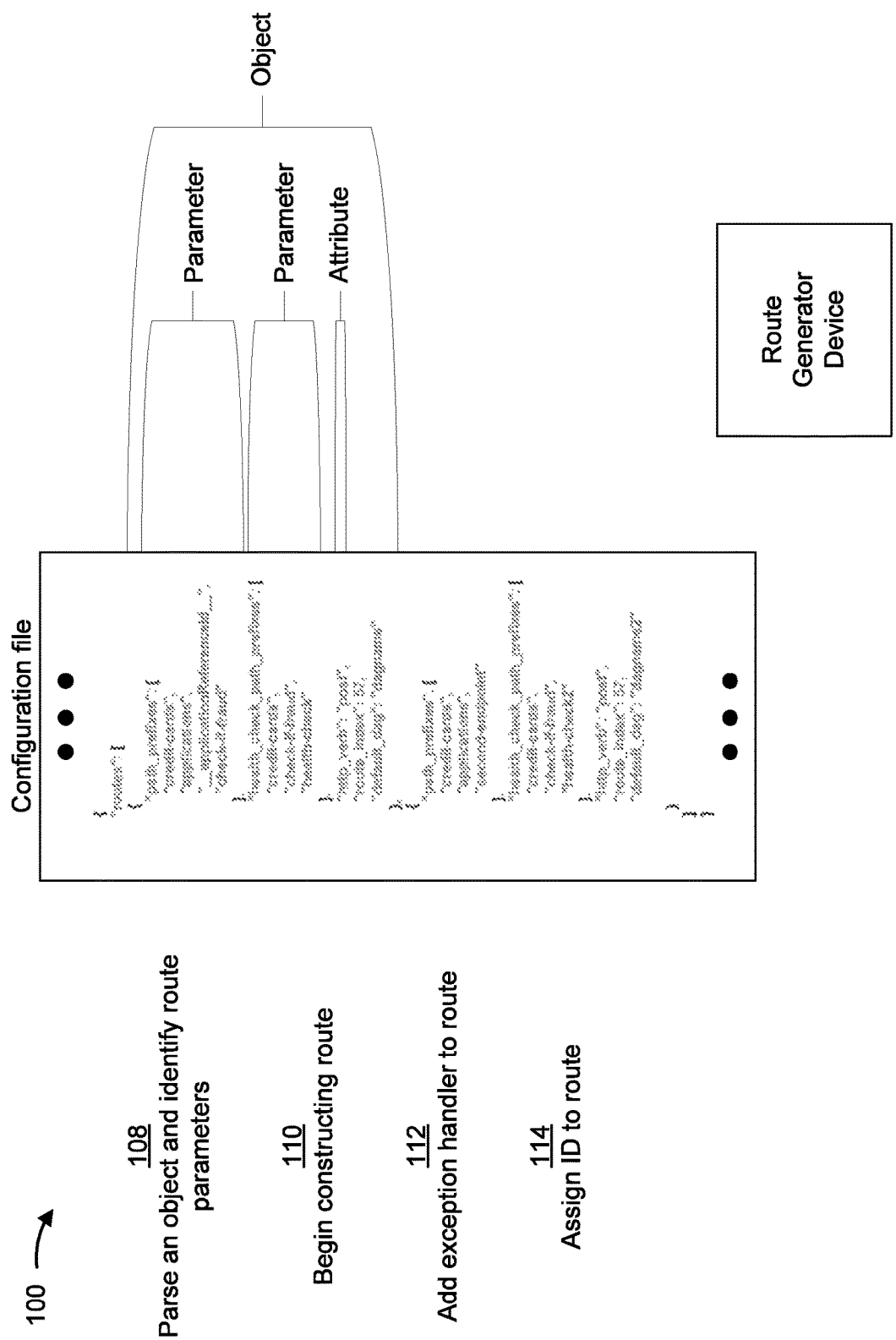

As shown in FIG. 1C, and by reference number 108, the route generator device may parse a first object of the one or more objects to recognize and/or identify the one or more parameters. For example, as shown in FIG. 1C, the route generator device may parse the first "routes" object to identify the "path_prefixes" parameter and the "health_check_path_prefixes" parameter. In some implementations, the route generator device may parse the first object to recognize and/or identify the attribute related to the HTTP route action. For example, as shown in FIG. 1C, the route generator device may parse the first "routes" object to identify the "http_verb" attribute that indicates a "post" HTTP route action.

As shown by reference number 110, the route generator device may begin constructing an HTTP route of the one or more HTTP routes (e.g., the route generator device may begin creating and adding computer code to the HTTP route). In some implementations, the route generator device may construct the HTTP route to include information concerning a first parameter of the one or more parameters and the attribute related to the HTTP route action. In some implementations, the route generator device may build the HTTP route based on the first parameter and the attribute related to the HTTP route action.

As shown by reference number 112, the route generator device may add an exception handler and/or an exception handling routine to the HTTP route (e.g., the route generator device may add computer code to the HTTP route that defines the exception handler and/or the exception handling routine). In some implementations, the exception handler and/or the exception handling routine may include a call to a function if an error occurs when the server device executes the HTTP route to attempt to establish the endpoint represented by the HTTP route. In some implementations, the exception handler and/or the exception handling routine may generate and provide, for display, a message if an error occurs when the server device executes the HTTP route to attempt to establish the endpoint represented by the HTTP route. For example, the exception handler and/or the exception handling routine may generate and return an HTTP response code for display that indicates an error (e.g., a "400—bad request" HTTP response code, a "401—unauthorized" HTTP response code, a "403—forbidden" HTTP response code, a "404—not found" HTTP response code, a "503—service unavailable" HTTP response code, a "504—gateway timeout" HTTP response code, and/or the like).

In some implementations, the exception handler and/or the exception handling routine may include a call to a function when the server device successfully establishes an endpoint by executing the HTTP route. In some implementations, the exception handler and/or the exception handling routine may generate and provide, for display, a message when the server device successfully establishes an endpoint based on the HTTP route. For example, the exception handler and/or the exception handling routine may generate and return an HTTP response code for display that indicates success (e.g., a "200—OK" HTTP response code, a "201—created" HTTP response code, a "202—accepted" HTTP response code, and/or the like).

As shown by reference number 114, the route generator device may assign an identifier to the HTTP route (e.g., the route generator device may add computer code to the HTTP route that defines the identifier). In some implementations, the identifier may be used to identify the HTTP route and/or distinguish the HTTP route from the remaining one or more HTTP routes. In some implementations, the identifier may be a universally unique identifier (UUID).

Figure 1D:
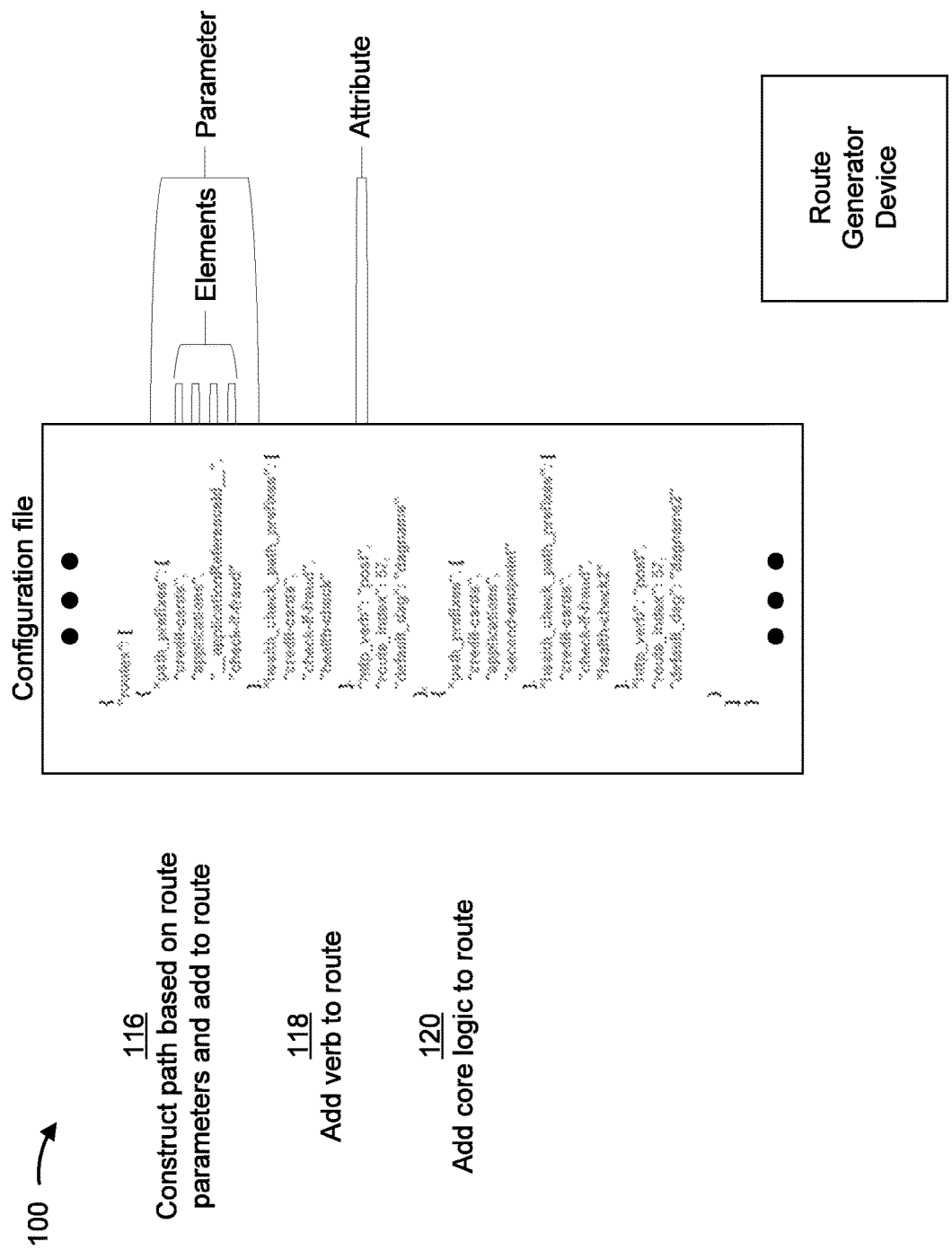

As shown in FIG. 1D, and by reference number 116, the route generator device may construct the HTTP path based on the first parameter of the one or more parameters (e.g., the route generator device may create the code that defines the HTTP path based on the first parameter). In some implementations, before constructing the HTTP path, the route generator device may store and/or cache the HTTP route (e.g., the HTTP route that includes the computer code that defines the exception handler, the exception handling routine, and/or the identifier) while creating the HTTP path. In some implementations, the first parameter may include one or more path elements related to the HTTP path. For example, the "path_prefixes" parameter includes the "credit-cards" path element, the "applications" path element, the "_applicationReferenceID_" path element, and the "check-if-fraud" path element. In some implementations, the route generator device may identify and/or determine the one or more path elements related to the HTTP path and construct the HTTP path based on the one or more path elements. In some implementations, the route generator device may process the one or more path elements to create the HTTP path using tail recursion (e.g., the route generator device may use a function to recursively call itself to process each of the one or more path elements, one path element at a time, and create the computer code that represents the HTTP path). For example, the route generator device may create the HTTP path based on the "path_prefixes" parameter, such that the HTTP path includes computer code that represents the "credit-cards" path element as a first component of the HTTP path, the "applications" path element as a second component of the HTTP path, the "_applicationReferenceID_" path element as a third component of the HTTP path, and the "check-if-fraud" path element as a fourth component of the HTTP path. In some implementations, if the route generator device determines, when processing a path element, that the path element is formatted as a query path element, the route generator device may add logic to the computer code to capture the query path element. For example, the route generator device may process the "_applicationReferenceID_" path element, determine that the "_applicationReferenceID_" path element is formatted as a query path element (e.g., because of the two consecutive underscores ("_") at the beginning and end of the "_applicationReferenceID_" path element) and create computer code that includes logic that indicates that the "_applicationReferenceID_" path parameter is a query path element. In some implementations, the route generator device may add the HTTP path to the HTTP route (e.g., the route generator device may add the computer code that represents the HTTP path to the HTTP route).

As shown by reference number 118, in some implementations, after the HTTP path is created and added to the HTTP route, the route generator device may identify and process the attribute related to the HTTP action to create an HTTP verb declaration. For example, the route generator device may process the "http_verb" attribute included in the first "routes" object, which indicates a "post" HTTP route action, and create a "post" HTTP verb declaration (e.g., the route generator device creates computer code that defines the "post" HTTP verb declaration). The route generator device may create an HTTP verb declaration that corresponds to an operation to create (e.g., "post"), read (e.g., "get"), update (e.g., "put" and/or "patch"), or delete (e.g., "delete") an API resource. In some implementations, the route generator device may add the HTTP verb declaration to the HTTP route (e.g., the route generator device adds the computer code that defines the HTTP verb declaration to the HTTP route).

As shown by reference number 120, in some implementations, the route generator device may add core logic, required to complete the HTTP route, to the HTTP route (e.g., the route generator device may add computer code that comprises the core logic, required to complete the computer code of the HTTP route, to the HTTP route).

In some implementations, the route generator device may create multiple HTTP routes by processing the configuration file. In some implementations, the route generator device may create one or more HTTP routes by processing each of the one or more objects, each of the one or more parameters of each of the one or more objects, the HTTP route action of each of the one or more objects, and/or each of the one or more path elements of each of the one or more parameters of each of the one or more objects in a similar manner to that described herein in relation to FIGS. 1A-1D.

Figure 1E:
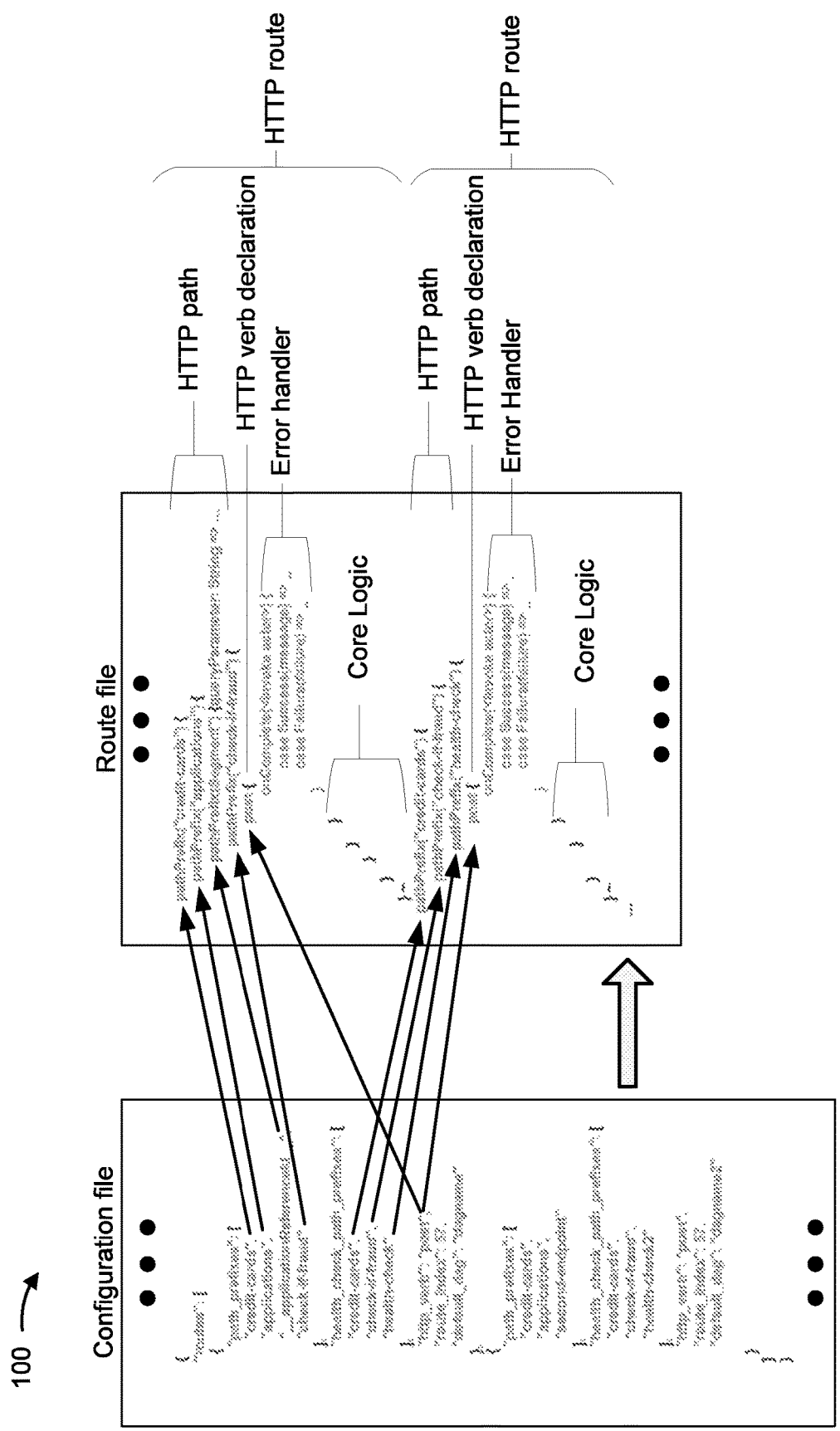

By way of example, FIG. 1E shows how information included in the configuration file may be processed by the route generator device to create multiple HTTP routes (e.g., where each HTTP route is represented by computer code that conforms to the Akka HTTP DSL) in a route file. For an HTTP route, FIG. 1E shows how the route generator device: creates and adds the HTTP path to the HTTP route based on the one or more parameters, creates and adds the HTTP verb declaration to the HTTP route based on the attribute related to the HTTP action, creates and adds the error handler to the HTTP route, and creates and adds the core logic to the HTTP route.

Figure 1F:
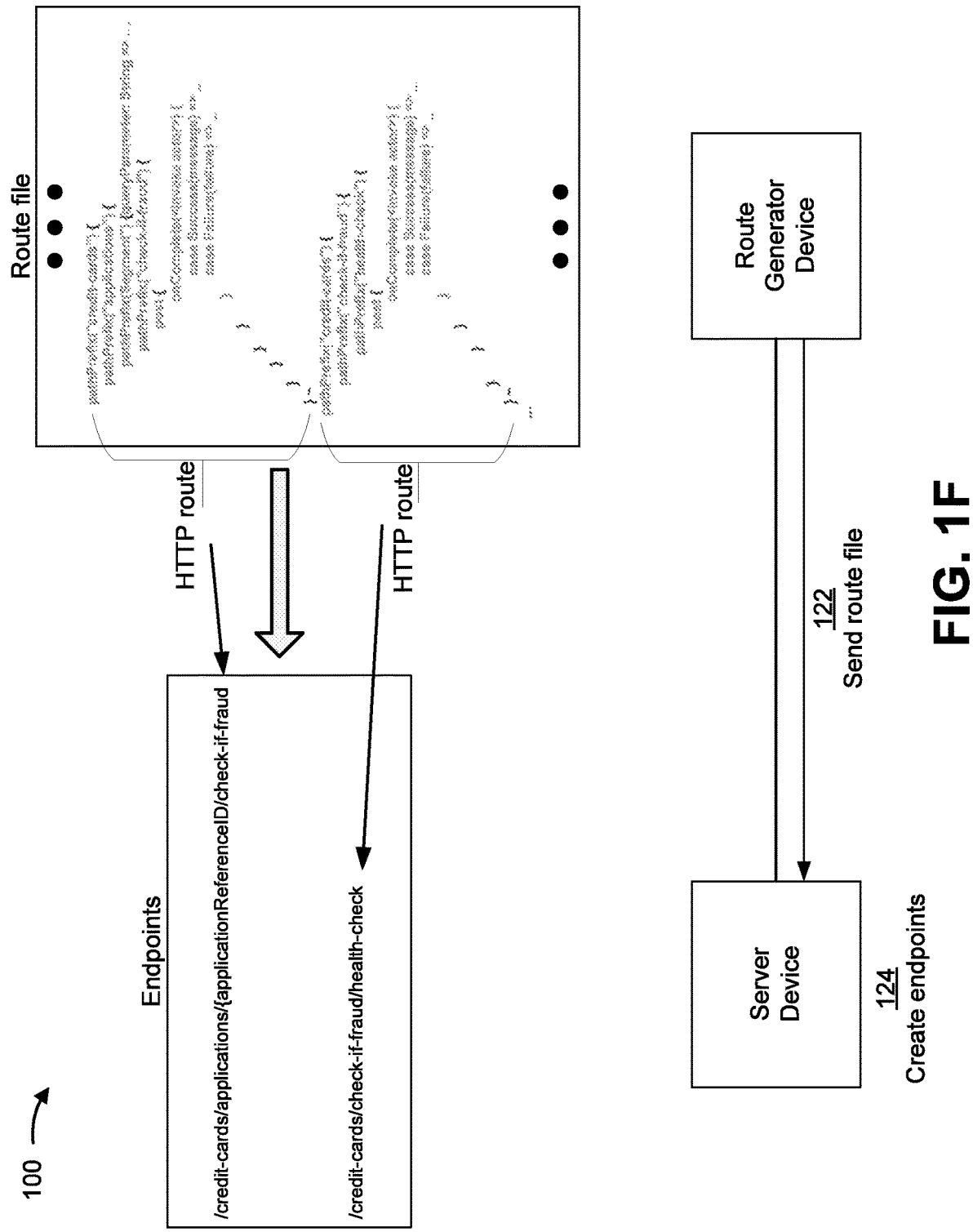

As shown in FIG. 1F and by reference number 122, the route generator device may send the route file, which comprises the one or more HTTP routes, to the server device to cause the server device to perform an operation based on the one or more HTTP routes, as described below. In some implementations, the route generator device may initialize the server device (e.g., by sending an initialization signal to the server device) before sending the file that comprises the one or more HTTP routes to the server device. In some implementations, the server device provides Representational State Transfer (REST) compliant web services. In some implementations, the server device may receive the file that comprises the one or more HTTP routes.

As shown by reference number 124, the server device may read the route file that comprises the one or more HTTP routes. In some implementations, the server device may determine the file format of the route file that comprises the one or more HTTP routes by reading the route file that comprises the one or more HTTP routes. For example, the server device may determine that the route file that comprises the one or more HTTP routes conforms to a file format for a DSL (e.g., the Akka HTTP DSL). In some implementations, the server device may recognize and/or identify the one or more HTTP routes that comprise the route file and execute the one or more HTTP routes (e.g., execute the computer code that represents each of the one or more HTTP routes). In some implementations, executing the one or more HTTP routes may cause the server device to create one or more endpoints (e.g., exposing one or more endpoints at the server device). For example, as shown in FIG. 1F, for an HTTP route of the one or more HTTP routes, the server device may create an endpoint based on information included in the HTTP route. In some implementations, each of the one or more endpoints may provide functionality for an API (e.g., provide access to an API resource).

In this way, the process for creating endpoints is automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to automatically create HTTP routes from a configuration file. Finally, automating the process for creating endpoints conserves computing resources (e.g., processor resources, memory resources, and/or the like) that would otherwise be wasted in attempting to test and debug handwritten code for creating endpoints.

As indicated above, FIGS. 1A-1F are provided merely as examples. Other examples are possible and may differ from what was described with regard to FIGS. 1A-1F.

Figure 2:
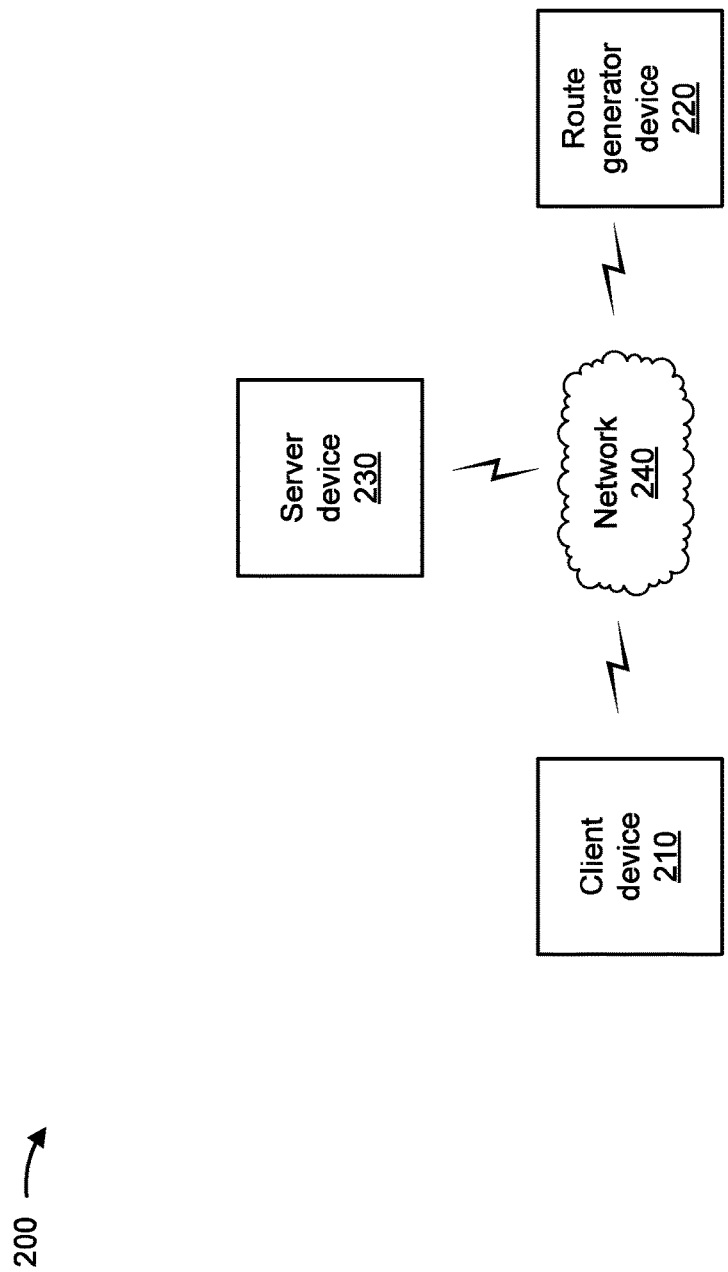
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include client device 210, route generator device 220, server device 230, and network 240. Devices of environment 200 may interconnect via wired connections, wireless connections, or a combination of wired and wireless connections.

Client device 210 includes one or more devices capable of receiving, generating, storing, processing, and/or providing information associated with creating endpoints. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may send a configuration file to route generator device 220.

Route generator device 220 includes one or more devices capable of receiving, generating, storing, processing, and/or providing information associated with creating endpoints. For example, route generator device 220 may include a communication and/or computing device, a server device or a group of server devices, a workstation computer or a group of workstation computers, a virtual machine (VM) or a group of virtual machines (VMs) implemented by one or more computing devices provided in a cloud computing environment, or a similar type or group of devices. In some implementations, route generator device 220 may receive a configuration file from client device 210, may read a configuration file, may identify route objects, may parse an object and identify route parameters, may begin constructing a route, may add an exception handler to a route, may assign an identifier to a route, may construct a path based on route parameters and add the path to a route, may add core logic to a route, and/or the like. In some implementations, route generator device 220 may send a route file to server device 230.

Server device 230 includes one or more devices capable of receiving, generating, storing, processing, and/or providing information associated with creating endpoints. For example, server device 230 may include a server device or a group of server devices, a workstation computer or a group of workstation computers, a virtual machine (VM) or a group of virtual machines (VMs) implemented by one or more computing devices provided in a cloud computing environment, or a similar type or group of devices. In some implementations, server device 230 may receive a route file from route generator device 220 and create an endpoint based on the route file.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
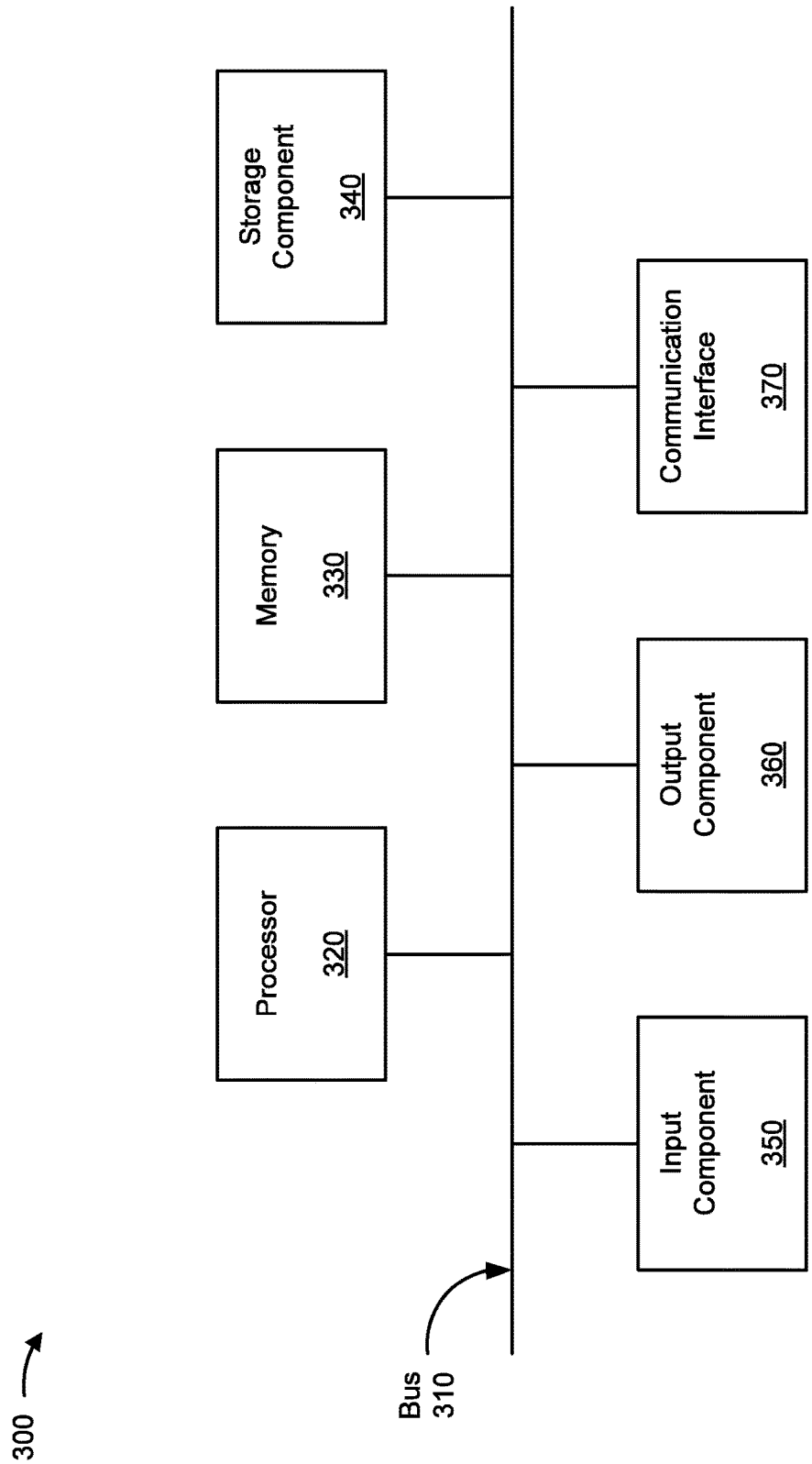
FIG. 3 is a diagram of example components of one or more devices of FIG. 2.

FIG. 3 is a diagram of example components of a device 300. Device 300 may correspond to client device 210, route generator device 220, and/or server device 230. In some implementations, client device 210, route generator device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for creating endpoints. In some implementations, one or more process blocks of FIG. 4 may be performed by a route generator device (e.g., route generator device 220). In some implementations, one or more process blocks of FIG. 4 may be performed by another device or a group of devices separate from or including the route generator device, such as a client device (e.g., client device 210) or a server device (e.g., server device 230).

As shown in FIG. 4, process 400 may include receiving a configuration file, wherein the configuration file includes an object concerning a Hypertext Transfer Protocol (HTTP) route, wherein the object includes a parameter related to the HTTP route, and wherein the parameter includes one or more elements related to the HTTP route, and an attribute related to an HTTP action (block 410). For example, the route generator device (e.g., using processor 320, memory 330, storage component 340, input component 350, communication interface 370, and/or the like) may receive a configuration file, as described above in connection with FIGS. 1A-1F. In some implementations, the configuration file may include an object concerning a HTTP route. In some implementations, the object may include a parameter related to the HTTP route and an attribute related to an HTTP action. In some implementations, the parameter may include one or more elements related to the HTTP route.

As further shown in FIG. 4, process 400 may include parsing the configuration file to recognize the object (block 420). For example, the route generator device (e.g., using processor 320, memory 330, storage component 340, and/or the like) may parse the configuration file to recognize the object, as described above in connection with FIGS. 1A-1F.

As further shown in FIG. 4, process 400 may include parsing the object to recognize the parameter (block 430). For example, the route generator device (e.g., using processor 320, memory 330, storage component 340, and/or the like) may parse the object to recognize the parameter, as described above in connection with FIGS. 1A-1F.

As further shown in FIG. 4, process 400 may include creating the HTTP route based on the parameter, wherein the HTTP route includes information concerning the one or more elements related to the HTTP route and the attribute related to the HTTP action (block 440). For example, the route generator device (e.g., using processor 320, memory 330, storage component 340, communication interface 370, and/or the like) may create the HTTP route based on the parameter, as described above in connection with FIGS. 1A-1F. In some implementations, the HTTP route may include information concerning the one or more elements related to the HTTP route and the attribute related to the HTTP action.

As further shown in FIG. 4, process 400 may include sending the HTTP route to a server, wherein sending the HTTP route to the server causes the server to perform an operation based on the HTTP route (block 450). For example, the route generator device (e.g., using processor 320, memory 330, storage component 340, output component 360, communication interface 370, and/or the like) may send the HTTP route to a server, as described above in connection with FIGS. 1A-1F. In some implementations, sending the HTTP route to the server may cause the server to perform an operation based on the HTTP route.

Process 400 may include additional implementations, such as any single implementation or any combination of implementations described below and/or in connection with one or more other processes described elsewhere herein.

In some implementations, the configuration file may be a JavaScript Object Notation (JSON) file. In some implementations, when creating the HTTP route based on the parameter, the route generator device may identify the one or more elements related to the HTTP route and the attribute related to the HTTP action, and may build the HTTP route based on the one or more elements related to the HTTP route and the attribute related to the HTTP action. In some implementations, when building the HTTP route based on the one or more elements related to the HTTP route and the attribute related to the HTTP action, the route generator device may process the one or more elements related to the HTTP route to create an HTTP path, may process the attribute related to the HTTP action to create an HTTP verb declaration, and may create the HTTP route to include the HTTP path and the HTTP verb declaration.

In some implementations, the route generator device may assign an identifier to the HTTP route. In some implementations, the identifier may be a universally unique identifier (UUID). In some implementations, the route generator device may add an exception handling routine to the HTTP route. In some implementations, the operation may include creating an HTTP endpoint. In some implementations, the HTTP endpoint may provide functionality for an application programming interface (API).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for creating endpoints. In some implementations, one or more process blocks of FIG. 5 may be performed by a route generator device (e.g., route generator device 220). In some implementations, one or more process blocks of FIG. 5 may be performed by another device or a group of devices separate from or including the route generator device, such as a client device (e.g., client device 210) or a server device (e.g., server device 230).

As shown in FIG. 5, process 500 may include receiving a configuration file, wherein the configuration file includes an object concerning a Hypertext Transfer Protocol (HTTP) route, wherein the object includes a parameter related to the HTTP route, wherein the parameter includes one or more elements related to the HTTP route, and an attribute related to an HTTP action (block 510). For example, the route generator device (e.g., using processor 320, memory 330, storage component 340, input component 350, communication interface 370, and/or the like) may receive a configuration file, as described above in connection with FIGS. 1A-1F. In some implementations, the configuration file may include an object concerning a HTTP route. In some implementations, the object may include a parameter related to the HTTP route and an attribute related to an HTTP action. In some implementations, the parameter may include one or more elements related to the HTTP route.

As further shown in FIG. 5, process 500 may include parsing the configuration file to recognize the object (block 520). For example, the route generator device (e.g., using processor 320, memory 330, storage component 340, and/or the like) may parse the configuration file to recognize the object, as described above in connection with FIGS. 1A-1F.

As further shown in FIG. 5, process 500 may include parsing the object to recognize the parameter (block 530). For example, the route generator device (e.g., using processor 320, memory 330, storage component 340, and/or the like) may parse the object to recognize the parameter, as described above in connection with FIGS. 1A-1F.

As further shown in FIG. 5, process 500 may include creating the HTTP route based on the parameter, wherein the HTTP route includes information concerning the one or more elements related to the HTTP route and the attribute related to the HTTP action (block 540). For example, the route generator device (e.g., using processor 320, memory 330, storage component 340, communication interface 370, and/or the like) may create the HTTP route based on the parameter, as described above in connection with FIGS. 1A-1F. In some implementations, the HTTP route may include information concerning the one or more elements related to the HTTP route and the attribute related to the HTTP action.

As further shown in FIG. 5, process 500 may include initializing a server, wherein the server provides Representational State Transfer (REST) compliant web services (block 550). For example, the route generator device (e.g., using processor 320, memory 330, storage component 340, communication interface 370, and/or the like) may initialize a server, as described above in connection with FIGS. 1A-1F. In some implementations, the server may provide REST compliant web services.

As further shown in FIG. 5, process 500 may include sending the HTTP route to the server, wherein sending the HTTP route to the server causes the server to perform an operation based on the HTTP route (block 560). For example, the route generator device (e.g., using processor 320, memory 330, storage component 340, output component 360, communication interface 370, and/or the like) may send the HTTP route to the server, as described above in connection with FIGS. 1A-1F. In some implementations, sending the HTTP route to the server may cause the server to perform an operation based on the HTTP route.

Process 500 may include additional implementations, such as any single implementation or any combination of implementations described below and/or in connection with one or more other processes described elsewhere herein.

In some implementations, the configuration file may conform to a JavaScript Object Notation (JSON) format. In some implementations, when creating the HTTP route based on the parameter, the route generator device may parse the parameter to identify the one or more elements related to the HTTP route and the attribute related to the HTTP action, and may build the HTTP route based on the one or more elements related to the HTTP route and the attribute related to the HTTP action. In some implementations, when building the HTTP route based on the one or more elements related to the HTTP route and the attribute related to the HTTP action, the route generator device may process the one or more elements related to the HTTP route to create an HTTP path, may process the attribute related to the HTTP action to create an HTTP verb declaration, and may create the HTTP route by joining the HTTP path and the HTTP verb declaration.

In some implementations, the route generator device may add an identifier to the HTTP route. In some implementations, the route generator device may add an exception handler to the HTTP route. In some implementations, the operation may include exposing an HTTP endpoint. In some implementations, the HTTP endpoint may provide functionality for an application programming interface (API).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for creating endpoints. In some implementations, one or more process blocks of FIG. 6 may be performed by a route generator device (e.g., route generator device 220). In some implementations, one or more process blocks of FIG. 6 may be performed by another device or a group of devices separate from or including the route generator device, such as a client device (e.g., client device 210) or a server device (e.g., server device 230).

As shown in FIG. 6, process 600 may include receiving a notification to download a configuration file, wherein the configuration file includes an object, of a plurality of objects, concerning a Hypertext Transfer Protocol (HTTP) route, wherein the object, of the plurality of objects, includes a parameter, of a plurality of parameters, related to the HTTP route, and wherein the parameter, of the plurality of parameters, includes one or more elements related to the HTTP route, and an attribute related to an HTTP action (block 610). For example, the route generator device (e.g., using processor 320, memory 330, storage component 340, input component 350, communication interface 370, and/or the like) may receive a notification to download a configuration file, as described above in connection with FIGS. 1A-1F. In some implementations, the configuration file may include an object, of a plurality of objects, concerning a HTTP route, wherein the object, of the plurality of objects, includes a parameter, of a plurality of parameters, related to the HTTP route, and an attribute related to an HTTP action. In some implementations, the parameter, of the plurality of parameters, includes one or more elements related to the HTTP route.

As further shown in FIG. 6, process 600 may include downloading the configuration file based on receiving the notification (block 620). For example, the route generator device (e.g., using processor 320, memory 330, storage component 340, input component 350, output component 360, communication interface 370, and/or the like) may download the configuration file based on receiving the notification, as described above in connection with FIGS. 1A-1F.

As further shown in FIG. 6, process 600 may include parsing the configuration file to recognize the object of the plurality of objects (block 630). For example, the route generator device (e.g., using processor 320, memory 330, storage component 340, and/or the like) may parse the configuration file to recognize the object of the plurality of objects, as described above in connection with FIGS. 1A-1F.

As further shown in FIG. 6, process 600 may include parsing the object, of the plurality of objects, to recognize the parameter, of the plurality of parameters (block 640). For example, the route generator device (e.g., using processor 320, memory 330, storage component 340, and/or the like) may parse the object, of the plurality of objects, to recognize the parameter, of the plurality of parameters, as described above in connection with FIGS. 1A-1F.

As further shown in FIG. 6, process 600 may include creating the HTTP route based on the parameter of the plurality of parameters, wherein the HTTP route includes information concerning the one or more elements related to the HTTP route and the attribute related to the HTTP action (block 650). For example, the route generator device (e.g., using processor 320, memory 330, storage component 340, communication interface 370, and/or the like) may create the HTTP route based on the parameter of the plurality of parameters, as described above in connection with FIGS. 1A-1F. In some implementations, the HTTP route may include information concerning the one or more elements related to the HTTP route and the attribute related to the HTTP action.

As further shown in FIG. 6, process 600 may include sending the HTTP route to a server, wherein sending the HTTP route to the server causes the server to perform an operation based on the HTTP route (block 660). For example, the route generator device (e.g., using processor 320, memory 330, storage component 340, output component 360, communication interface 370, and/or the like) may send the HTTP route to a server, as described above in connection with FIGS. 1A-1F. In some implementations, sending the HTTP route to the server causes the server to perform an operation based on the HTTP route.

Process 600 may include additional implementations, such as any single implementation or any combination of implementations described below and/or in connection with one or more other processes described elsewhere herein.

In some implementations, the configuration file may use a JavaScript Object Notation (JSON) format. In some implementations, when creating the HTTP route based on the parameter, of the plurality of parameters, the route generator device may determine the one or more elements related to the HTTP route and the attribute related to the HTTP action, and may build the HTTP route based on the one or more elements related to the HTTP route and the attribute related to the HTTP action. In some implementations, when building the HTTP route based on the one or more elements related to the HTTP route and the attribute related to the HTTP action, the route generator device may process the one or more elements related to the HTTP route included in the object to create an HTTP path using tail recursion, may process the attribute related to the HTTP action to create an HTTP verb declaration, and may create the HTTP route based on the HTTP verb declaration and the HTTP path. In some implementations, the route generator device may add an exception handling routine and an identifier to the HTTP route. In some implementations, the operation may include creating an endpoint. In some implementations, the endpoint may provide access to an application programming interface (API) resource.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a route generator device 220 that may be capable of creating a hypertext transfer protocol (HTTP) route, which is executable computer code, based on a configuration file, such that executing the HTTP route at a server device 230 creates an endpoint. In some implementations, the user may describe the endpoint in the configuration file in a human-readable format and send the configuration file to the route generator device. In some implementations, the configuration file can include information (e.g., objects, parameters, elements, attributes, identification information, and/or the like) that can be parsed and processed by the route generator device to create the HTTP route. In some implementations, the configuration file can include information that can be parsed and processed by route generator device 220 to create multiple HTTP routes.

In this way, route generator device 220 enables a user to easily create endpoints. This reduces the amount of technical training or API-specific knowledge that the user needs to create the endpoint. This also reduces the amount of time a user has to spend on creating the endpoints, which reduces costs. Moreover, route generator device 220 enforces uniformity and consistency in computer code deployments for creating endpoints, which reduces the possibilities of computer code defects and the need for testing and debugging of computer code. This can conserve processor and/or memory resources of client device 210, route generator device 220, and/or server device 230.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a configuration file,
      wherein the configuration file includes data concerning a Hypertext Transfer Protocol (HTTP) route;
   parsing, by the device, the data concerning the HTTP route to determine:
      a parameter related to the HTTP route, and
      an attribute related to an HTTP action; and
   creating, by the device, the HTTP route and an HTTP verb declaration based on the parsing of the data concerning the HTTP route.

2. The method of claim 1, wherein the HTTP route includes computer code, conforming to a domain specific language, that causes creation of an endpoint by a server device.

3. The method of claim 1, wherein the configuration file further includes data concerning at least one other HTTP route; and
   wherein the method further comprises:
      creating the at least one other HTTP route based on the data concerning the at least one other HTTP route.

4. The method of claim 1, further comprising:
   determining that the configuration file uses a particular format; and
   wherein parsing the data concerning the HTTP route comprises:
      parsing the data concerning the HTTP route based on the particular format.

5. The method of claim 1, wherein creating the HTTP route comprises:
   including, in the HTTP route, information concerning the parameter and the attribute.

6. The method of claim 1, further comprising:
   adding, to the HTTP route, computer code that defines an exception handler or exception handling routine.

7. The method of claim 1, wherein the parameter includes one or more elements of an HTTP path associated with an application programming interface resource associated with the HTTP route.

8. A device, comprising:
one or more memories; and
one or more processors coupled to the one or more memories, configured to:
receive a configuration file,
wherein the configuration file includes data concerning a Hypertext Transfer Protocol (HTTP) route;
parse the data concerning the HTTP route to determine:
a parameter related to the HTTP route, and
an attribute related to an HTTP action; and
create the HTTP route and an HTTP verb declaration based on the parsing of the data concerning the HTTP route.

9. The device of claim 8, wherein the HTTP route includes computer code, conforming to a domain specific language, that causes creation of an endpoint by a server device.

10. The device of claim 8, wherein the configuration file further includes data concerning at least one other HTTP route; and
wherein the one or more processors are further configured to:
create the at least one other HTTP route based on the data concerning the at least one other HTTP route.

11. The device of claim 8, wherein the one or more processors are further configured to:
determine that the configuration file uses a particular format; and
wherein the one or more processors, when parsing the data concerning the HTTP route, are further configured to:
parse the data concerning the HTTP route based on the particular format.

12. The device of claim 8, wherein the one or more processors, when creating the HTTP route, are further configured to:
include, in the HTTP route, information concerning the parameter and the attribute.

13. The device of claim 8, wherein the one or more processors are further configured to:
add, to the HTTP route, computer code that defines an exception handler or exception handling routine.

14. The device of claim 8, wherein the parameter includes one or more elements of an HTTP path associated with an application programming interface resource associated with the HTTP route.

15. A non-transitory computer-readable medium storing instructions, the instructions comprising:
one or more instructions that, when executed by one or more processors, cause the one or more processors to:
receive a configuration file,
wherein the configuration file includes data concerning a Hypertext Transfer Protocol (HTTP) route;
parse the data concerning the HTTP route to determine:
a parameter related to the HTTP route, and
an attribute related to an HTTP action; and
create the HTTP route and an HTTP verb declaration based on the parsing of the data concerning the HTTP route.

16. The non-transitory computer-readable medium of claim 15, wherein the HTTP route includes computer code, conforming to a domain specific language, that causes creation of an endpoint by a server device.

17. The non-transitory computer-readable medium of claim 15, wherein the configuration file further includes data concerning at least one other HTTP route; and
wherein the one or more instructions, when executed by the one or more processors, further cause the one or more processors to:
create the at least one other HTTP route based on the data concerning the at least one other HTTP route.

18. The non-transitory computer-readable medium of claim 15, wherein the one or more instructions, when executed by the one or more processors, further cause the one or more processors to:
determine that the configuration file uses a particular format; and
wherein the one or more instructions, that cause the one or more processors to parse the data concerning the HTTP route, cause the one or more processors to:
parse the data concerning the HTTP route based on the particular format.

19. The non-transitory computer-readable medium of claim 15, wherein the one or more instructions, that cause the one or more processors to create the HTTP route, cause the one or more processors to:
include, in the HTTP route, information concerning the parameter and the attribute.

20. The non-transitory computer-readable medium of claim 15, wherein the one or more instructions, when executed by the one or more processors, further cause the one or more processors to:
add, to the HTTP route, computer code that defines an exception handler or exception handling routine.

* * * * *